US009753685B2

(12) United States Patent
Kawabata et al.

(10) Patent No.: US 9,753,685 B2
(45) Date of Patent: Sep. 5, 2017

(54) INFORMATION PROCESSING APPARATUS, IMAGE FORMING SYSTEM, AND NON-TRANSITORY COMPUTER READABLE MEDIUM

(71) Applicant: FUJI XEROX CO., LTD., Tokyo (JP)

(72) Inventors: Nobuhide Kawabata, Kanagawa (JP); Yasuhiro Mori, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/093,176

(22) Filed: Apr. 7, 2016

(65) Prior Publication Data
US 2017/0115937 A1  Apr. 27, 2017

(30) Foreign Application Priority Data
Oct. 26, 2015  (JP) .................................. 2015-210122

(51) Int. Cl.
  G06F 3/12   (2006.01)
  H04N 1/32   (2006.01)
  H04N 1/21   (2006.01)
  H04N 1/00   (2006.01)
(52) U.S. Cl.
  CPC .......... *G06F 3/1273* (2013.01); *G06F 3/1203* (2013.01); *G06F 3/1211* (2013.01); *G06F 3/1274* (2013.01); *H04N 1/00411* (2013.01); *H04N 1/2166* (2013.01); *H04N 1/32443* (2013.01)
(58) Field of Classification Search
  CPC .... G06F 3/1273; G06F 3/1203; G06F 3/1211; G06F 3/1274; H04N 1/00411; H04N 1/2166; H04N 1/32443

USPC ........................................................ 358/1.16
See application file for complete search history.

(56) References Cited

U.S. PATENT DOCUMENTS

| 8,953,193 B2 * | 2/2015 | Naito ................. G03G 15/5079 |
|---|---|---|
| | | 358/1.14 |
| 2007/0014614 A1 * | 1/2007 | Yoshida ............. G03G 15/5016 |
| | | 400/62 |
| 2009/0201544 A1 * | 8/2009 | Kumakura .......... H04N 1/32122 |
| | | 358/1.15 |
| 2013/0227358 A1 | 8/2013 | Yokokura |
| 2014/0089744 A1 * | 3/2014 | Oshiro .................... G06F 11/08 |
| | | 714/48 |

(Continued)

FOREIGN PATENT DOCUMENTS

| JP | 2008-198034 A | 8/2008 |
|---|---|---|
| JP | 2009-003591 A | 1/2009 |
| JP | 2009-265965 A | 11/2009 |

(Continued)

*Primary Examiner* — Allen H Nguyen
(74) *Attorney, Agent, or Firm* — Oliff PLC

(57) ABSTRACT

An information processing apparatus includes a log storage and a log deleting unit. The log storage stores log information in a memory. The log information indicates a history of a process in an image forming apparatus which forms an image on recording material. The log deleting unit deletes log information from the memory among pieces of log information stored in the memory. The deleted log information satisfies a predetermined condition. The log deleting unit does not delete log information related to an abnormality occurring in the image forming apparatus, even when the log information related to the abnormality satisfies the predetermined condition.

8 Claims, 7 Drawing Sheets

(56) References Cited

U.S. PATENT DOCUMENTS

2014/0233433 A1* 8/2014 Miida .................... G06Q 30/04
                                                          370/260
2015/0109438 A1* 4/2015 Matsuda .................. H04N 5/76
                                                          348/143

FOREIGN PATENT DOCUMENTS

JP          2012-155420 A       8/2012
JP          2013-092967 A       5/2013

* cited by examiner

FIG. 4

| TASK NAME | OTHER RELATED TASKS |
|---|---|
| Task-A | Task-B, Task-C, Task-D |
| Task-B | Task-A, Task-C |
| Task-C | Task-A, Task-B |
| Task-D | Task-A |
| Task-E | none |

FIG. 5

| TASK NAME | STORAGE CONDITION |
|---|---|
| Task-A | LONG-TERM STORAGE (STORAGE PERIOD: 180 DAYS) |
| Task-B | MEDIUM-TERM STORAGE (STORAGE PERIOD: 30 DAYS) |
| Task-C | MEDIUM-TERM STORAGE (STORAGE PERIOD: 30 DAYS) |
| Task-D | MEDIUM-TERM STORAGE (STORAGE PERIOD: 30 DAYS) |
| Task-E | SHORT-TERM STORAGE (STORAGE PERIOD: ONE DAY) |

FIG. 6

| ERROR OCCURRENCE DATE AND TIME | ERROR OCCURRENCE TASK | LOG STORAGE | FILE NAME | RELATED TASK | LOG STORAGE | FILE NAME | RELATED TASK | LOG STORAGE | FILE NAME | RELATED TASK | LOG STORAGE | FILE NAME |
|---|---|---|---|---|---|---|---|---|---|---|---|---|
| 7/13/2015 15:25 | Task-A | DONE | A1.log | Task-B | | | Task-C | | | Task-D | DONE | D1.log |
| | Task-A | | | Task-B | | | Task-C | | | Task-D | | |

INFORMATION PROCESSING APPARATUS, IMAGE FORMING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-210122 filed Oct. 26, 2015.

BACKGROUND

Technical Field

The present invention relates to an information processing apparatus, an image forming system, and a non-transitory computer readable medium.

SUMMARY

According to an aspect of the invention, there is provided an information processing apparatus including a log storage and a log deleting unit. The log storage stores log information in a memory. The log information indicates a history of a process in an image forming apparatus which forms an image on recording material. The log deleting unit deletes log information from the memory among pieces of log information stored in the memory. The deleted log information satisfies a predetermined condition. The log deleting unit does not delete log information related to an abnormality occurring in the image forming apparatus, even when the log information related to the abnormality satisfies the predetermined condition.

BRIEF DESCRIPTION OF THE DRAWINGS

Exemplary embodiment of the present invention will be described in detail based on the following figures, wherein:

FIG. 4 is a diagram illustrating an exemplary task management table;

FIG. 5 is a diagram illustrating an exemplary log-deletion management table;

FIG. 6 is a diagram illustrating an exemplary log-storage management table.

DETAILED DESCRIPTION

Referring to the attached drawings, an exemplary embodiment of the present invention will be described in detail below.

Description about Overall Configuration of Image Forming Apparatus

Figure 1:
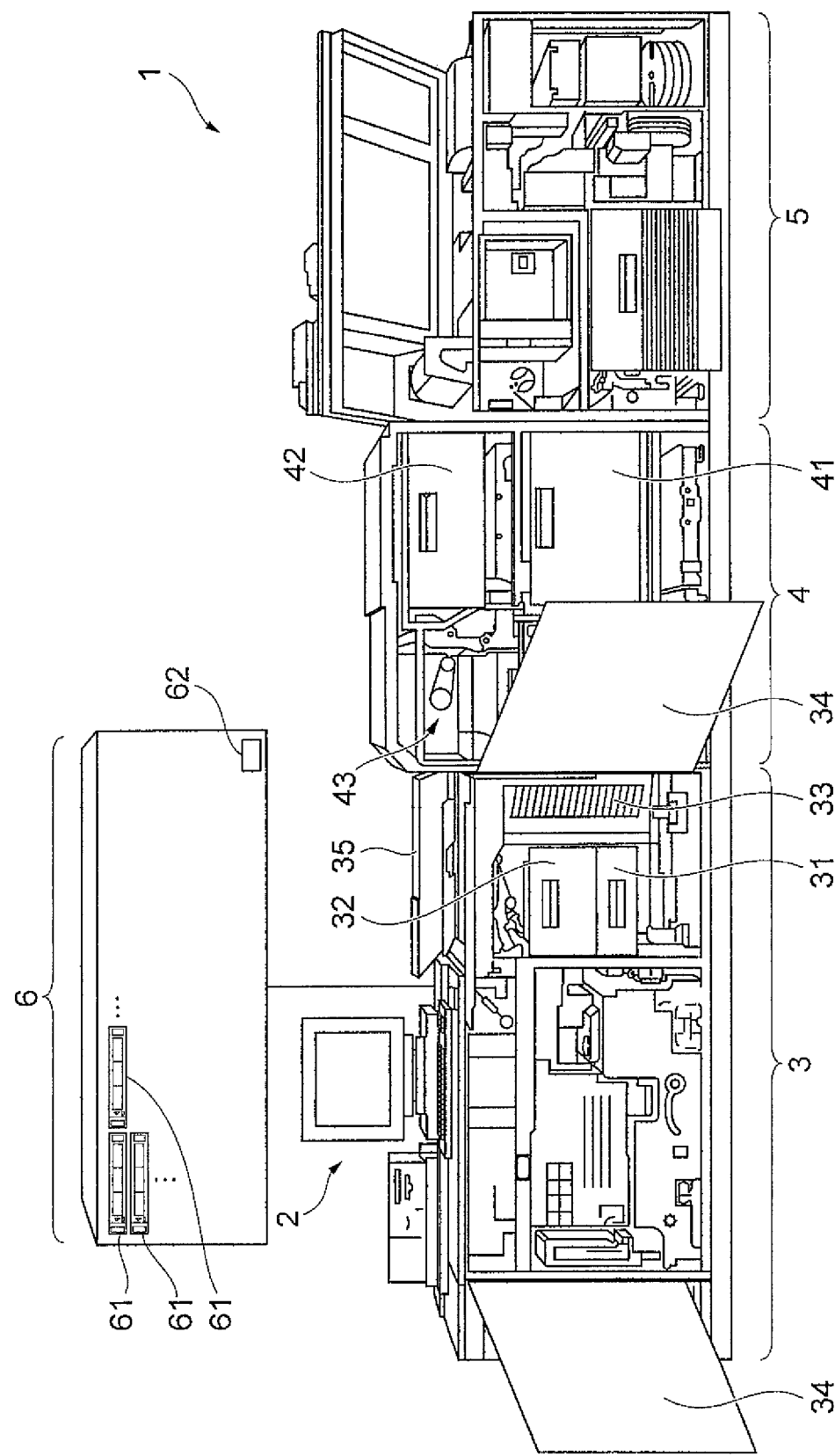
FIG. 1 is a diagram illustrating an exemplary overall configuration of an image forming apparatus according to an exemplary embodiment.

FIG. 1 is a diagram illustrating an exemplary overall configuration of an image forming apparatus 1 according to the exemplary embodiment.

The image forming apparatus 1 includes a controller 2 which controls mechanism units of the image forming apparatus 1, and an image forming unit 3 functioning as a print mechanism for forming an image on a sheet of paper (recording material or a recording medium). The image forming apparatus 1 further includes a sheet containing unit 4 which contains sheets of paper used in the image forming unit 3, a post-processing unit 5 which performs post-processing on sheets of paper on which images have been formed by the image forming unit 3, and a storage apparatus 6 which stores print data (image data) that is to be supplied to the image forming unit 3.

In the exemplary embodiment, the controller 2 has exemplary functions provided for an information processing apparatus.

The controller 2 of the image forming apparatus 1 is connected to a network (not illustrated), and receives print data from a personal computer (PC) or the like (not illustrated) via the network. The controller 2 processes the received print data, and temporarily accumulates the processed print data in the storage apparatus 6. The controller 2 sequentially reads print data from the storage apparatus 6 at a rate matching the print speed of the image forming unit 3, and transmits the read print data to the image forming unit 3.

The controller 2 monitors the condition of the image forming apparatus 1. When an abnormality is detected in the image forming apparatus 1, the controller 2 displays an image associated with an operation that is to be performed by an operator in an abnormal state, and presents the image to the operator. The controller 2 also displays information about the state of the storage apparatus 6, and presents the state information to the operator.

The controller 2 stores, in the inside of the controller 2, the storage apparatus 6, and the like, log information indicating a history of various processes performed in the image forming apparatus 1. The controller 2 includes an input device, such as a touch panel or a keyboard, and receives an operation from an operator.

The image forming unit 3 forms an image on a sheet of paper by using coloring materials on the basis of print data supplied from the controller 2. In the exemplary embodiment, the image forming unit 3 uses, for example, an electrophotographic system. That is, for example, a drum-shaped photoreceptor is uniformly charged, and the photoreceptor is exposed to light controlled on the basis of the print data, so that an electrostatic latent image is formed on the photoreceptor. A developing device causes the electrostatic latent image to be turned to a visible image (toner image) with toner which is the coloring materials. The toner image is transferred onto a sheet of paper, and the transferred image is fixed by a fixing device applying heat and pressure, whereby an image is formed.

The image forming unit 3 is not limited to one using an electrophotographic system, and may be one using an inkjet system which uses ink as coloring material to form an image by ejecting ink on a recording medium.

The image forming unit 3 includes sheet trays 31 and 32 aside from sheet trays 41 and 42 of the sheet containing unit 4 which are described below. A conveying system (not illustrated) for conveying a sheet of paper from the sheet tray 31 or 32 to the image forming unit 3 is provided.

The image forming unit 3 further includes a discharge tray unit 33. When a sheet of paper on which an image has been formed by the image forming unit 3 does not need post-processing in the post-processing unit 5, the sheet of paper is discharged to the discharge tray unit 33.

The image forming unit 3 includes openable covers 34 and 35. By opening the openable covers 34 and 35, maintenance operations, such as adjustment of the mechanism units of the image forming unit 3, replacement of consumables, and removal of a sheet of paper on occurrence of a paper jam, may be performed.

The sheet containing unit 4 includes the sheet trays 41 and 42. Each of the sheet tray 41 and the sheet tray 42 in addition to the sheet trays 31 and 32 may contain sheets of paper. A sheet of paper corresponding to print data is selected by the controller 2, is pulled out from any one of the sheet trays 31, 32, 41, and 42, and is conveyed to the image forming unit 3 by a conveying system (not illustrated).

The sheet containing unit 4 is, so to speak, an optional apparatus. When a sheet type which is not present in the sheet trays 31 and 32 of the image forming unit 3 is needed, the sheet containing unit 4 may be added. Therefore, when the sheet types which are present in the sheet trays 31 and 32 are sufficient, the sheet containing unit 4 is not necessarily provided.

The sheet containing unit 4 is equipped with a sheet conveying unit 43 in an upper portion of the sheet containing unit 4. When the post-processing unit 5 performs post-processing, the sheet conveying unit 43 conveys a sheet of paper from the image forming unit 3 to the post-processing unit 5.

The post-processing unit 5 performs post-processing, such as cutting, folding, punching, binding, and bookbinding, on sheets of paper on which images have been formed. The post-processing unit 5 is also, so to speak, an optional apparatus. When post-processing is not necessary, the post-processing unit 5 is not necessarily connected.

The storage apparatus 6 stores print data received from a PC or the like (not illustrated). The storage apparatus 6 includes, for example, several tens to several hundreds of hard disk drives (HDDs) 61, and stores print data in the HDDs 61. Each of the HDDs 61 has, for example, a capacity of 500 gigabyte (GB) or 1 terabyte (TB). The storage apparatus 6 has such a mass storage area, and print data is sequentially transmitted from the storage apparatus 6 to the image forming unit 3 at a rate matching the print speed of the image forming unit 3, whereby printing is performed so that intermittent printing (that is, printing with certain intervals) does not occur.

Each of the HDDS 61 included in the storage apparatus 6 has attribute information indicating the internal state of the HDD 61. The attribute information of each of the HDDs 61 is notified to the controller 2, whereby the controller 2 grasps the states of the HDDs 61. As the attribute information, for example, Self-Monitoring, Analysis and Reporting Technology (S.M.A.R.T.) is used. S.M.A.R.T. is information that indicates the internal state, that is issued by a hard disk drive itself, and that aims to provide early detection of a failure and prediction of a trouble in the hard disk drive.

The storage apparatus 6 further includes a power supply unit 62 which supplies power to each of the HDDs 61 under control of the controller 2.

Exemplary Functional Configuration of Controller

Figure 2:
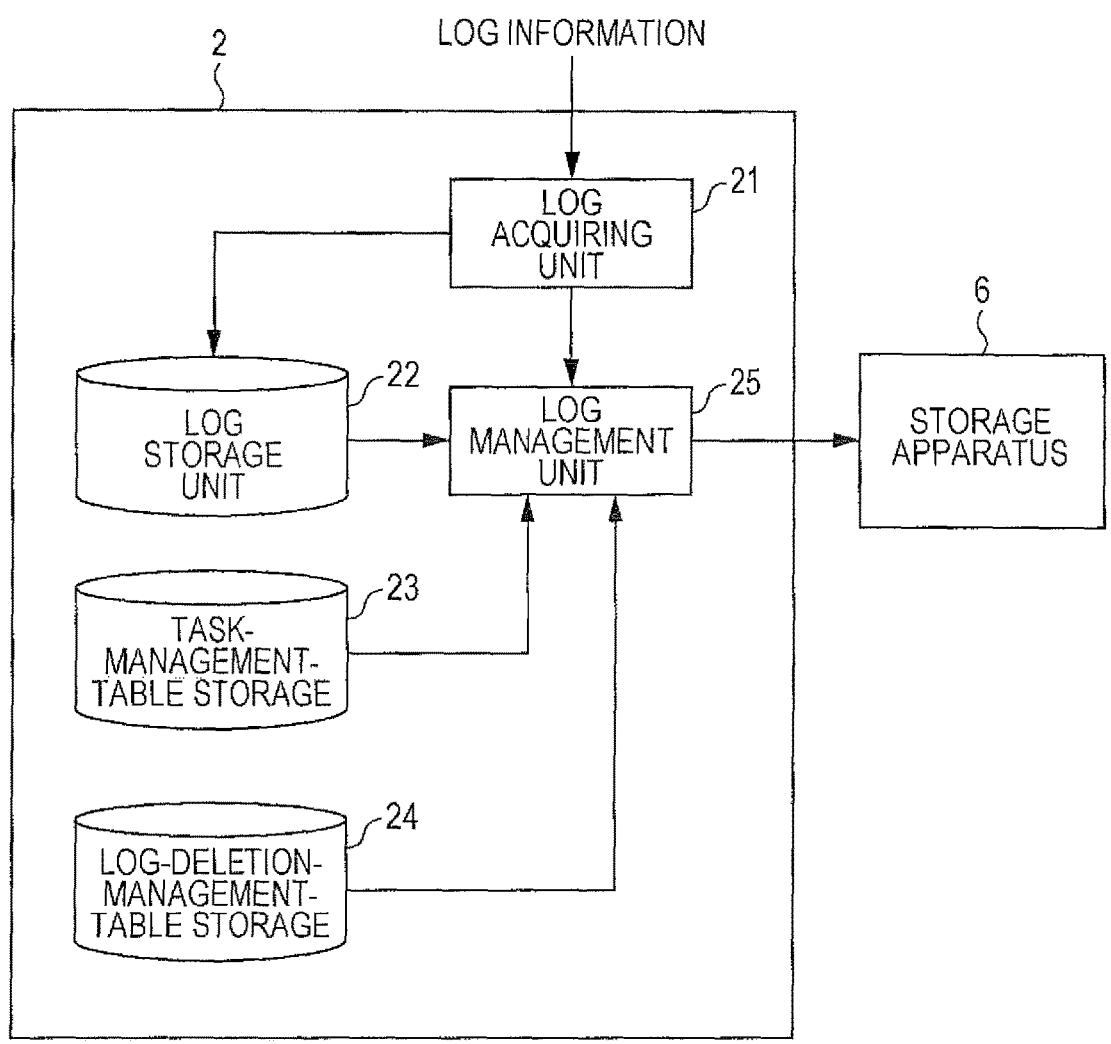
FIG. 2 is a block diagram illustrating an exemplary functional configuration of a controller.

The functional configuration of the controller 2 included in the image forming apparatus 1 will be described. FIG. 2 is a block diagram illustrating an exemplary functional configuration of the controller 2.

The controller 2 includes a log acquiring unit 21 which acquires log information of various processes performed in the image forming apparatus 1, a log storage unit 22 which stores the log information, and a task-management-table storage 23 which stores a table (hereinafter referred to as a task management table) in which, for each task performed in the image forming apparatus 1, information about other tasks related to the task is defined. The controller 2 also includes a log-deletion-management-table storage 24 which stores a table (hereinafter referred to as a log-deletion management table) in which conditions for deleting log information are defined, and a log management unit 25 which manages log information.

The log acquiring unit 21 acquires log information of various processes such as image formation performed in the image forming apparatus 1. The log information is acquired per task which is a unit of various processes performed in the image forming apparatus 1. More specifically, a task is a process performed by using various programs, and each task is defined in advance on the basis of programs for the task.

The log storage unit 22 stores log information acquired by the log acquiring unit 21. The log storage unit 22 functions as a first area in which log information is first stored. When no free space is left in the log storage unit 22, log information is sequentially extracted from the log storage unit 22, starting with the first-entry log information by using first-in first-out (FIFO). The extracted log information is transferred to the HDDs 61 of the storage apparatus 6 which are a second area storing log information. The log information extracted from the log storage unit 22 is subjected to a determination process (hereinafter referred to as a deletion determination process) in which the log management unit 25 described below determines whether the log information is to be transferred to the HDDs 61 or is to be deleted without being transferred to the HDDs 61.

The task-management-table storage 23 stores a task management table in which, for each task performed in the image forming apparatus 1, information about other tasks related to the task is defined. For example, when "Task B" related to the task "Task A" is present, Task B is associated with Task A in the task management table. The detail of the task management table will be described below.

The log-deletion-management-table storage 24 stores a log-deletion management table in which conditions for deleting log information are defined. In the log-deletion management table, conditions for deleting log information which has been transferred from the log storage unit 22 and which is stored in the HDDs 61 are defined. More specifically, in the log-deletion management table, a condition for deleting log information is defined for each task. The detail of the log-deletion management table will be described below.

The log management unit 25 manages log information stored in the log storage unit 22 and the HDDs 61, and transfers and deletes the log information.

Specifically, when no free space is left in the log storage unit 22, the log management unit 25 sequentially extracts, from the log storage unit 22, log information stored in the log storage unit 22, starting with the first-entry log information, and performs the deletion determination process in which whether the log information is to be transferred to the HDDs 61 or is to be deleted without being transferred to the HDDs 61 is determined. If the log information has been set in advance to be presented to an operator, the log management unit 25 determines that the log information is to be transferred to the HDDs 61. When a task in which an error (abnormality) has occurred during processing is present, the log management unit 25 determines that log information of the task in which an error has occurred and log information of other tasks which are set in advance as those related to the task are not to be deleted and are to be transferred to the HDDs 61.

More specifically, examples of log information to be presented to an operator include log information about the result of a printing process which indicates a normal end or abnormal end of the printing process. This log information is not deleted through the determination made by the log management unit 25 and is deleted from the HDDs 61 through a delete instruction transmitted from an operator.

When an error occurs during processing, log information includes information about the error code which is an error code given in advance for each error type, information about the error which occurs, and information about a task in which the error has occurred. Therefore, in error analysis, these types of log information are used. In error analysis, in addition to log information of a task in which an error has occurred, log information of other tasks related to the task is needed. Log information of the related tasks is used in error analysis regardless of whether the tasks (the related tasks) end normally or abnormally. If a task in which an error has occurred during processing is present, the log management unit 25 refers to the task management table and specifies other tasks related to the task in which the error has occurred. The log management unit 25 transfers log information of the task in which the error has occurred and log information of the related tasks from the log storage unit 22 to the HDDs 61 without deleting the log information.

In other words, if no error had occurred in a task in which an error has occurred, log information of the task in which the error has occurred and log information of the related tasks would have been deleted under normal conditions at a timing at which no free space was present in the log storage unit 22 and at which the log information was extracted from the log storage unit 22. However, occurrence of an error causes the deletion condition to be compulsively changed, and the log information is transferred to the HDDs 61 without being deleted, and is stored in the HDDs 61.

In the exemplary embodiment, log information of a task in which an error has occurred and log information of other tasks related to the task are used as exemplary log information related to an abnormality. Log information extracted from the log storage unit 22 because no free space is left in the log storage unit 22 is used as exemplary log information satisfying a predetermined condition.

The log management unit 25 generates a table (hereinafter referred to as a log-storage management table) for managing a task in which an error has occurred and the related tasks. The detail of the log-storage management table will be described below.

The log management unit 25 refers to the log-deletion management table for each piece of log information transferred to the HDDs 61, and deletes the piece from the HDDs 61 under a condition defined in the log-deletion management table. For example, the log management unit 25 deletes log information for which one day is set as a retention period in the log-deletion management table, from the HDDs 61 when one day has elapsed after transmission of the log information to the HDDs 61.

In the exemplary embodiment, the log acquiring unit 21 and the log management unit 25 function as an exemplary log storage. The log management unit 25 also functions as an exemplary log deleting unit.

Hardware Configuration of Controller

Figure 3:
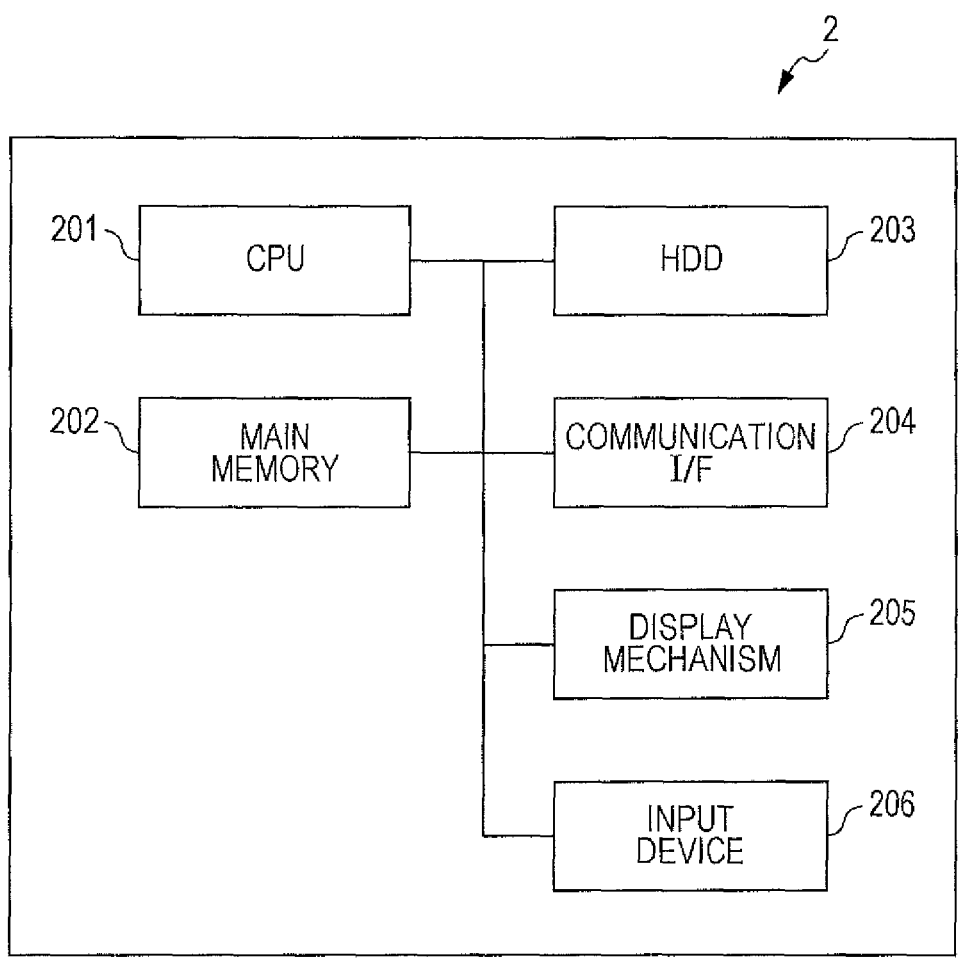
FIG. 3 is a diagram illustrating an exemplary hardware configuration of the controller.

The hardware configuration of the controller 2 will be described. FIG. 3 is a diagram illustrating an exemplary hardware configuration of the controller 2. As illustrated in FIG. 3, the controller 2 includes a central processing unit (CPU) 201 which is a computing unit, and a main memory 202 and an HDD 203 which are memories.

The CPU 201 executes various programs, such as an operating system (OS) and an application, and implements the functions of the controller 2. The main memory 202 is a storage area storing various programs, data used in execution of the programs, and the like. The HDD 203 is a storage area storing input data for the various programs, output data from the various programs, and the like. The controller 2 also includes a communication interface (I/F) 204 for performing communication with the outside, a display mechanism 205 constituted by a video memory, a display, and the like, and an input device 206, such as a touch panel or a keyboard.

The functional units which are included in the controller 2 and which are illustrated in FIG. 2 are implemented through collaboration of software and hardware resources. Specifically, the CPU 201 reads programs for implementing the log acquiring unit 21, the log management unit 25, and the like, for example, from the HDD 203 to the main memory 202, and executes the programs, whereby these functional units are implemented. The log storage unit 22 is implemented, for example, by using the main memory 202. The task-management-table storage 23 and the log-deletion-management-table storage 24 are implemented, for example, by using the HDD 203.

Description About Task Management Table

The task management table stored in the task-management-table storage 23 will be described. FIG. 4 is a diagram illustrating an exemplary task management table.

In the task management table illustrated in FIG. 4, the name of each task is shown in the field "TASK NAME". The task names of the related tasks are shown for each task. For example, for a task whose "TASK NAME" is "Task-A", "Task-B", "Task-C", and "Task-D" are set as related tasks. In other words, when an error occurs in "Task-A", log information of each of the tasks of "Task-B", "Task-C", and "Task-D" is needed in addition to log information of "Task-A" to perform error analysis. For example, for a task whose "TASK NAME" is "Task-E", no related tasks are present, and "none" is set. In other words, when an error occurs in "Task-E", only log information of "Task-E" is needed to perform error analysis.

Description About Log-Deletion Management Table

The log-deletion management table stored in the log-deletion-management-table storage 24 will be described. FIG. 5 is a diagram illustrating an exemplary log-deletion management table.

In the log-deletion management table illustrated in FIG. 5, the name of each task is shown in the field "TASK NAME". For each task, a condition for storing log information of the task in the HDDs 61 is set. For example, log information of a task whose "TASK NAME" is "Task-A" is stored in the HDDs 61 for a long period, and the retention period which is a period from start of storage of the log information to deletion of the log information is 180 days. For example, log information of a task whose "TASK NAME" is "Task-E" is stored in the HDDs 61 for a short period, and the retention period is one day.

In other words, the retention period for log information of each task is set in accordance with the type of the log information of the task, that is to say, in accordance with information about the process of the task. For example, among programs for operating the image forming apparatus 1, log information of a task corresponding to a main routine (main process) which performs core logic control is set to be stored for a long period. In contrast, for example, log information of a task corresponding to a subroutine which is called from a main routine and which is an independent process is set to be stored for a medium-term period or a short period which is shorter than the retention period of the main routine.

The condition for storing log information is not limited to a condition in which a period from start of storage of log information in the HDDs 61 to deletion of the log information is set. For example, a period from a time at which log information is generated, to a time at which the log information is deleted may be set. Alternatively, the number of occurrences of log information may be focused on. For example, when ten pieces of log information of the same type have been generated and have been stored in the HDDs 61, the log information may be deleted.

Description About Log-Storage Management Table

The log-storage management table generated by the log management unit 25 will be described. FIG. 6 is a diagram illustrating an exemplary log-storage management table.

In the log-storage management table illustrated in FIG. 6, information about a task in which an error has occurred and information about other tasks related to the task are registered. In this example, an error occurs in the task "Task-A", and tasks of "Task-B", "Task-C", and "Task-D" are registered as other tasks related to "Task-A". Specifically, the error occurrence date and time of "7/13/2015 15:25" is illustrated as information about "Task-A". The field "LOG STORAGE" indicates information about whether or not log information has been transferred to the HDDs 61. In "LOG STORAGE", "DONE" indicates that log information has been transferred, and a blank indicates that log information has not been transferred. The "LOG STORAGE" data of "Task-A" indicates "DONE". This shows that the log information has been transferred to the HDDs 61. The field "FILE NAME" contains the file name of log information.

Similarly, for related tasks, the fields "LOG STORAGE" and "FILE NAME" are illustrated. For example, the "LOG STORAGE" data for "Task-D" indicates "DONE", and the "FILE NAME" data indicates "D1.log". This shows that the file "D1.log" has been transferred as log information to the HDDs 61. In contrast, for example, the "LOG STORAGE" data for "Task-B" indicates a blank. This shows that the log information has not been transferred to the HDDs 61.

After being transferred to the HDDs 61, log information of each task is deleted from the HDDs 61 in accordance with a condition which is set in the log-deletion management table. At a timing at which log information is deleted from the HDDs 61, a record about the task corresponding to the deleted log information is deleted from the log-storage management table. For example, when log information of "Task-A" is deleted from the HDDs 61, the "ERROR OCCURRENCE DATE AND TIME" data, the "ERROR OCCURRENCE TASK" data, the "LOG STORAGE" data, and the "FILE NAME" data of "Task-A" are deleted in the log-storage management table.

In the example in FIG. 6, the case in which an error occurs in the task "Task-A" is described. Occurrence of an error in a certain task causes data to be added to the log-storage management table.

Procedure of Deletion Determination Process

Figure 7:
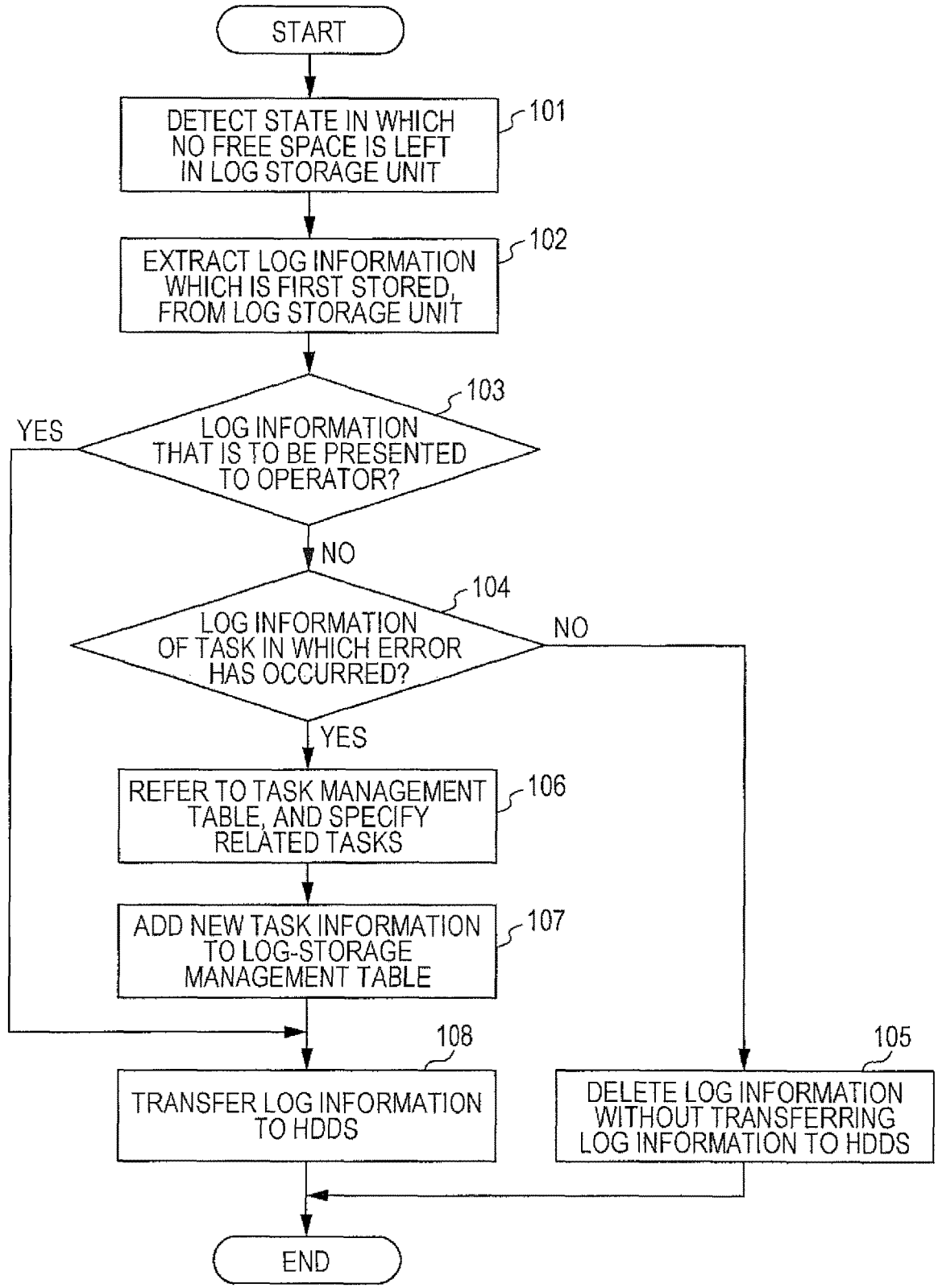
FIG. 7 is a flowchart of an exemplary procedure of a deletion determination process.

The procedure of the deletion determination process performed by the log management unit 25 will be described. FIG. 7 is a flowchart of an exemplary procedure of the deletion determination process. The procedure illustrated in FIG. 7 is performed in the case where no free space is left in the log storage unit 22 when log information is to be stored in the log storage unit 22.

Tasks are performed in the image forming apparatus 1, whereby the log acquiring unit 21 acquires log information, and stores the acquired log information in the log storage unit 22. As log information is stored in the log storage unit 22, free space in the log storage unit 22 is decreased. When no free space is left in the log storage unit 22, the log management unit 25 detects the state in which no free space is left in the log storage unit 22 (step 101). The log management unit 25 extracts, from the log storage unit 22, log information which is first stored, among pieces of log information stored in the log storage unit 22 (step 102).

The log management unit 25 determines whether or not the extracted log information has been set in advance to be presented to an operator (step 103). If the determination result in step 103 is positive (YES), the process proceeds to step 108 described below. In contrast, if the determination result in step 103 is negative (NO), the log management unit 25 determines whether or not the extracted log information is log information of a task in which an error has occurred (step 104).

If the determination result in step 104 is negative (NO), the extracted log information is neither log information that is to be presented to an operator, nor log information of a task in which an error has occurred. Therefore, the log management unit 25 deletes the extracted log information without transferring the log information to the HDDs 61 (step 105).

In contrast, if the determination result in step 104 is positive (YES), the log management unit 25 refers to the task management table and specifies tasks related to the task which has generated the extracted log information (that is, the task in which an error has occurred) (step 106). The log management unit 25 adds new information about the task which has generated the extracted log information and new information about the tasks related to the task to the log-storage management table (step 107).

After step 107 is performed or if the determination result in step 103 is positive (YES), the log management unit 25 transfers the log information to the HDDs 61 (step 108). More specifically, after step 107, the log information extracted in step 102 is log information of a task in which an error has occurred. Therefore, the log management unit 25 transfers the extracted log information to the HDDs 61, and extracts log information of the related tasks from the log storage unit 22 and transfers the extracted log information to the HDDs 61. If the determination result in step 103 is positive (YES), the log information extracted in step 102 is to be presented to an operator. Therefore, the log management unit 25 transfers the extracted log information to the HDDs 61. Then, the process flow ends.

In step 108, the log management unit 25 extracts log information of tasks related to the task in which an error has occurred, from the log storage unit 22. However, the log information is occasionally not stored in the log storage unit 22. Log information of related tasks is handled as log information which is necessary for error analysis, because an error has occurred. However, before the error occurs, the log information is handled as normal log information. Normal log information is not transferred to the HDDs 61, and is deleted at a time point at which the log information is extracted from the log storage unit 22 in step 102. Therefore, although log information of related tasks is necessary for error analysis, the log information may have been deleted from the log storage unit 22. Therefore, the log management unit 25 may output information indicating whether or not log information which is necessary for error analysis has been stored in the log storage unit 22 and has been therefore extracted. The output information may be presented to an operator, for example, by displaying the information on the display mechanism 205. In this case, the log management unit 25 functions as an exemplary output unit.

In step 108, the log management unit 25 transfers the log information of the related tasks as well as the log information of the task in which an error has occurred, to the HDDs 61. However, the log information of the related tasks and the log information of the task in which an error has occurred may be separately transferred. For example, the log management unit 25 may transfer the log information of the task in which an error has occurred, to the HDDs 61 in step 108, and may transfer the log information of the related tasks to the HDDs 61 when the log information is obtained from the log storage unit 22 in step 102. In this case, the log management unit 25 determines whether or not log information extracted in step 102 is log information of a task related to the task in which an error has occurred. If the log information is log information of a related task, the log management unit 25 transfers the log information to the HDDs 61.

Specific Example of Process of Managing Log Information

A process of managing log information will be described by using a specific example. In this example, the task management table illustrated in FIG. 4 and the log-deletion management table illustrated in FIG. 5 are predetermined. A case in which an error occurs in a task whose "TASK NAME" is "Task-A" will be described. Steps described below correspond to steps in FIG. 7.

Tasks are performed in the image forming apparatus 1, whereby log information is stored in the log storage unit 22. When the log management unit 25 is to store new log information in the log storage unit 22, if no free space is left in the log storage unit 22, the log management unit 25 detects the state in which no free space is left in the log storage unit 22 (step 101). The log management unit 25 extracts, from the log storage unit 22, log information which is first stored, among pieces of log information stored in the log storage unit 22 (step 102). In this step, assume that the log management unit 25 extracts log information about a task whose "TASK NAME" is "Task-A".

Log information of "Task-A" is not log information to be presented to an operator (NO in step 103), and an error has occurred in the task "Task-A" (YES in step 104). Therefore, the log management unit 25 refers to the task management table illustrated in FIG. 4, and specifies tasks related to the task "Task-A" (step 106). In this step, tasks of "Task-B", "Task-C", and "Task-D" are specified.

The log management unit 25 adds, to the log-storage management table, new information about "Task-A" which is a task in which an error has occurred and new information about "Task-B", "Task-C", and "Task-D" which are tasks related to "Task-A" (step 107). In this step, as in the log-storage management table illustrated in FIG. 6, information about "ERROR OCCURRENCE DATE AND TIME", "ERROR OCCURRENCE TASK", "LOG STORAGE", and "FILE NAME" is stored for "Task-A". In addition, information about "RELATED TASK", "LOG STORAGE", and "FILE NAME" is stored for "Task-B", "Task-C", and "Task-D".

The log management unit 25 extracts log information of "Task-A", "Task-B", "Task-C", and "Task-D" from the log storage unit 22, and transfers the log information to the HDDs 61 (step 108). Log information of each task has been transferred, whereby "DONE" is recorded in the field "LOG STORAGE" in the log-storage management table.

Among pieces of log information to be transferred to the HDDs 61, log information which does not include date and time information of error occurrence is log information generated when a process is normally performed without errors, and is occasionally not used in error analysis. Therefore, the log management unit 25 may determine that such log information generated when a process is normally performed is not necessary for error analysis, and may delete the log information without transferring the log information to the HDDs 61.

The log management unit 25 refers to the log-deletion management table and specifies a condition for storage in the HDDs 61 for each piece of log information which has been transferred to the HDDs 61. The log management unit 25 deletes each piece of log information from the HDDs 61 in accordance with the conditions in the log-deletion management table. For example, in the log-deletion management table illustrated in FIG. 5, the retention period for "Task-A" is set to 180 days. Therefore, when 180 days have elapsed after log information of the task "Task-A" is stored in the HDDs 61, the log management unit 25 deletes the log information from the HDDs 61. As log information of the task "Task-A" is deleted from the HDDs 61, the log management unit 25 also deletes information about "ERROR OCCURRENCE DATE AND TIME", "ERROR OCCURRENCE TASK", "LOG STORAGE", and "FILE NAME" of "Task-A" which is recorded in the log-storage management table.

More specifically, in this example, the case in which log information extracted from the log storage unit 22 is log information of a task in which an error has occurred is described. In the case where log information extracted from the log storage unit 22 is to be presented to an operator, after the log information is transferred to the HDDs 61, the log information is presented to the operator. The operator transmits a deletion instruction, whereby the log management unit 25 deletes the log information from the HDDs 61. In the case where log information extracted from the log storage unit 22 is not any of log information to be presented to an operator, log information of a task in which an error has occurred, and log information of the related tasks, the log information is deleted without being transferred to the HDDs 61.

As described above, in the image forming apparatus 1 according to the exemplary embodiment, log information about various processes is stored in the log storage unit 22. When log information is to be stored in the log storage unit 22, if no free space is left in the log storage unit 22, the deletion determination process is performed. Log information of a task in which an error has occurred and log information of the related tasks are transferred to the HDDs 61 without being deleted. In other words, when no free space is left in the log storage unit 22, log information extracted from the log storage unit 22 is deleted under normal conditions at a timing at which the log information is extracted from the log storage unit 22. In contrast, an error occurs in a task, whereby the condition for deletion is changed, and log information of the task in which the error has occurred and log information of the related tasks are stored in the HDDs 61.

In the exemplary embodiment, before the log management unit 25 deletes, from the HDDs 61, log information which is necessary for error analysis, that is, log information of a task in which an error has occurred and log information of the related tasks, the log management unit 25 may output the log information to the outside via a network (not illustrated). Similarly, before the log management unit 25 deletes, from the HDDs 61, log information that is to be presented to an operator, the log management unit 25 may output the log information to the outside via a network (not illustrated).

In the exemplary embodiment, the log storage unit 22 functions as the first area in which log information is stored, and the HDDs 61 function as the second area. The configuration is not limited to this. For example, the log storage unit 22 may be divided into the first area and the second area. Alternatively, for example, the HDDs 61 may be divided into the first area and the second area.

In the exemplary embodiment, the controller 2 in the image forming apparatus 1 includes the log acquiring unit 21 and the log management unit 25. Alternatively, the functions of the log acquiring unit 21 and the log management unit 25 may be implemented by using an external apparatus connected to the image forming apparatus 1.

A system provided with the functions of the image forming apparatus 1, the log acquiring unit 21, and the log management unit 25 may be regarded as an exemplary image forming system.

Programs for embodying the exemplary embodiment of the present invention may be provided by storing the programs in a storage medium such as a compact disc-read-only memory (CD-ROM), let alone by using a communication unit.

The exemplary embodiment of the present invention is described. The technical scope of the present invention is not limited to the above-described exemplary embodiment. It is clear for a person skilled in the art that various changes may be made and an alternative embodiment may be employed without departing from the spirit and scope of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a log storage that stores log information in a memory, the log information indicating a history of processes in an image forming apparatus which forms an image on recording material; and
   a log deleting unit that deletes log information from the memory among pieces of log information stored in the memory if (i) there is no free space in storage and (ii) the log information satisfies a precondition, with the proviso that even if these two conditions occur, the log deleting unit does not delete the log information if the log information is determined to be related to an abnormality, which includes either (i) log information of a process in which an abnormality has occurred; or (ii) log information of a different process which is predetermined as a process related to the process in which an abnormality has occurred.

2. The information processing apparatus according to claim 1,
   wherein, after a period predetermined in accordance with a type of the log information related to the abnormality elapses, the log deleting unit deletes the log information from the memory.

3. The information processing apparatus according to claim 1, wherein the log deleting unit deletes, from the memory through an instruction, a piece of log information among the pieces of log information, the piece of log information being log information that is to be presented to an operator, the pieces of log information being stored in the memory, the instruction being provided by the operator.

4. The information processing apparatus according to claim 1, further comprising:
   an output unit that, when the abnormality occurs in the image forming apparatus, outputs information indicating whether or not the log information related to the abnormality is stored in the memory.

5. The information processing apparatus according to claim 1,
   wherein, when the log information related to the abnormality and log information that is to be presented to an operator are to be deleted from the memory among the pieces of log information stored in the memory, the log deleting unit outputs, to an outside via a network, the log information related to the abnormality and the log information that is to be presented to an operator, and then deletes, from the memory, the log information related to the abnormality and the log information that is to be presented to an operator.

6. The information processing apparatus according to claim 1,
   wherein the memory is divided into a first area and a second area, the first area being an area in which log information is first stored, the second area being an area to which the log information is transferred after the log information is stored in the first area, and wherein, when no free space is left in the first area, the log deleting unit extracts log information stored in the first area, and, if the extracted log information is the log information related to the abnormality, the log deleting unit transfers the extracted log information to the second area without deleting the extracted log information.

7. An image forming system comprising:
   an image forming apparatus that forms an image on recording material; and
   an information processing apparatus including a log storage that stores log information in a memory, the log information indicating a history of processes in the image forming apparatus, and a log deleting unit that deletes log information from the memory among pieces of log information stored in the memory if (i) there is no free space in storage and (ii) the log information satisfies a precondition, with the proviso that even if these two conditions occur, the log deleting unit does not delete the log information if the log information is determined to be related to an abnormality, which includes either (i) log information of a process in which an abnormality has occurred; or (i) log information of a different process which is predetermined as a process related to the process in which an abnormality has occurred.

8. A non-transitory computer readable medium storing a program causing a computer to execute a process comprising:

storing log information in a memory, the log information indicating a history of processes in an image forming apparatus which forms an image on recording material; and performing a process of deleting log information from the memory among pieces of log information stored in the memory if (i) there is no free space in storage and (ii) the log information satisfies a precondition, with the proviso that even if these two conditions occur, the log information is not deleted if the log information is determined to be related to an abnormality, which includes either (i) log information of a process in Which an abnormality has occurred; or (ii) log information of a different process which is predetermined as a process related to the process in which an abnormality has occurred.

* * * * *